United States Patent
Wolfinger et al.

(10) Patent No.: US 11,022,231 B2
(45) Date of Patent: Jun. 1, 2021

(54) SOLENOID VALVE

(71) Applicant: Marotta Controls, Inc., Montville, NJ (US)

(72) Inventors: Maxwell Wolfinger, Montville, NJ (US); Christopher Strianse, Montville, NJ (US); Keith Brodek, Montville, NJ (US); Alexander Colletti, Montville, NJ (US); Brian Ippolitto, Montville, NJ (US)

(73) Assignee: Marotta Controls, Inc., Montville, NJ (US)

( * ) Notice: Subject to any disclaimer, the term of this patent is extended or adjusted under 35 U.S.C. 154(b) by 114 days.

(21) Appl. No.: 16/265,172

(22) Filed: Feb. 1, 2019

(65) Prior Publication Data

US 2020/0191295 A1    Jun. 18, 2020

Related U.S. Application Data (60) Provisional application No. 62/779,578, filed on Dec. 14, 2018.

(51) Int. Cl.
*F16K 31/06* (2006.01)

(52) U.S. Cl.
CPC ................ *F16K 31/0655* (2013.01)

(58) Field of Classification Search
CPC ........ F16K 1/44; F16K 1/443; F16K 31/0624; F16K 31/0627; F16K 31/0655; F16K 31/0675
See application file for complete search history.

(56) References Cited

U.S. PATENT DOCUMENTS 4,074,700 A * 2/1978 Engle .................. F16K 31/0627
                                                    137/625.27
4,611,631 A * 9/1986 Kosugi ............... F16K 31/0627
                                                    137/625.27
(Continued)

FOREIGN PATENT DOCUMENTS

CH          331648 A      7/1958
DE         1169236 B      4/1964
(Continued)

OTHER PUBLICATIONS

Extended European Search Report for EP Application No. 19159131.2 dated Aug. 1, 2019.

*Primary Examiner* — Eric Keasel
(74) *Attorney, Agent, or Firm* — Lerner, David, Littenberg, Krumholz & Mentlik, LLP (57) ABSTRACT

A solenoid operated valve includes a valve block defining a valve lumen, a poppet slidably disposed within the valve lumen, a solenoid including an annular winding with an internal surface defining a winding lumen and an external surface, and a core including a central core portion disposed within the winding lumen and an annular core portion disposed outside the external surface of the winding, and an armature including a central armature portion disposed within the winding lumen and an annular armature portion disposed outside the external surface of the winding, wherein the armature is in communication with the poppet so that movement of one is translated into movement of the other. Solenoids for such valves are provided. Also provided are methods of assembling solenoid valves.

22 Claims, 10 Drawing Sheets

(56) References Cited

U.S. PATENT DOCUMENTS

| | | |
|---|---|---|
| 4,810,985 A | 3/1989 | Mesenich |
| 5,785,299 A * | 7/1998 | Katsuta .............. F16K 31/0627 |
| | | 137/625.27 |
| 2016/0096177 A1 | 4/2016 | Sugiura et al. |

FOREIGN PATENT DOCUMENTS

| | | |
|---|---|---|
| EP | 0296983 A1 | 12/1988 |
| EP | 0936636 A3 | 8/2000 |
| JP | S5534093 U | 3/1980 |
| WO | 2011122147 A1 | 10/2011 |

* cited by examiner

SOLENOID VALVE

CROSS-REFERENCE TO RELATED APPLICATIONS

The present application claims the benefit of the filing date of U.S. Provisional Patent Application No. 62/779,578 filed Dec. 14, 2018, the disclosure of which is hereby incorporated herein by reference.

BACKGROUND OF THE INVENTION

The present invention generally relates to solenoid operated valves, and more particularly to solenoid operated valves having novel solenoid geometry and fewer assembly components to prolong the working life of the valve.

Solenoid operated valves are useful in many industrial applications and offer a number of advantages over traditional mechanical valves. Automotive uses can involve environments subject to high and prolonged levels of vibration. Aeronautical devices such as rockets often involve exceptionally high levels of vibration and may require that the valves be subject to numerous uses before replacement. These types of environments can lead to failure of certain aspects of a solenoid operated valve, which in turn can negatively impact or prevent the use of the device in which the valve is employed.

Prior art valves include valve blocks comprised of several pieces. This is necessary to facilitate assembly of a poppet in which the enlarged portion must be located in a central section of the valve block so that it can oscillate back and forth for contact with seats of smaller diameter within the lumen. Loading the monolithic poppet into the lumen of the valve block to the appropriate position cannot be done without providing a space wide enough to accommodate the size of the enlarged portion of the poppet. This means that a large passage of the valve block is initially open and then closed with complimentary components to construct a smaller portion of the lumen once the poppet has been installed. Valve blocks of this many components are susceptible to wear and failure, at least because the number and precise sizing of the parts, along with the aggregate tolerances cause by manufacturing, can lead to valves that operate imprecisely or inaccurately over time. Further, prior art valves use solenoids that provide forces that are suboptimal when the solenoid is energized.

There remains room for improvement in the design and use of solenoid operated valves.

BRIEF SUMMARY OF THE INVENTION

A first aspect of the present invention is a solenoid operated valve including a valve block defining a valve lumen, a poppet slidably disposed within the valve lumen, a solenoid including an annular winding with an internal surface defining a winding lumen and an external surface, and a core including a central core portion disposed within the winding lumen and an annular core portion disposed outside the external surface of the winding, and an armature including a central armature portion disposed within the winding lumen and an annular armature portion disposed outside the external surface of the winding, wherein the armature is in communication with the poppet so that movement of one is translated into movement of the other.

In accordance with other embodiments of the first aspect, the central core portion may have a pole surface and the annular core portion may have a pole surface coplanar with the pole surface of the central core portion, and the central armature portion may have a pole surface and the annular armature portion may have a pole surface coplanar with the pole surface of the central armature portion. The coplanar pole surfaces of the core may face the coplanar pole surfaces of the armature. The coplanar pole surfaces of the core may define a first plane and the coplanar pole surfaces of the armature may define a second plane, the first and second planes passing through the annular winding. When the valve is energized, the coplanar pole surfaces of the core and the coplanar pole surfaces of the armature may each be situated substantially half way between ends of the winding. The solenoid operated valve may further include a coil cover enclosing the solenoid.

The core may include a base core portion opposite the pole surfaces of the annular core portion and the central core portion, the base core portion forming a monolithic structure with the annular core portion and the central core portion. The core may define an annular recess bounded by the base core portion, the annular core portion, and the central core portion, wherein the winding is disposed at least partially within the annular recess of the core.

The armature may include a base armature portion opposite the pole surfaces of the annular armature portion and the central armature portion, the base armature portion forming a monolithic structure with the annular armature portion and the central armature portion. The armature may define an annular recess bounded by the base armature portion, the annular armature portion, and the central armature portion, wherein the winding is disposed at least partially within the annular recess of the armature. The base armature portion and central armature portion may define an armature lumen through which a portion of the poppet is disposed. The armature lumen may by coaxially aligned with the winding lumen.

The valve block may be a monolithic structure in which the valve lumen defines a central axis and includes a first portion separated along the axis from a second portion by an intermediate portion, the first portion defines a first inner surface having a first constant valve diameter, the second portion defines a second inner surface having a second constant valve diameter, the intermediate portion has a maximum relief diameter that is larger than the first and second constant valve diameters, a first seat defined at the intersection of the first inner surface and the intermediate portion, and a second seat defined at the intersection of the second inner surface and the intermediate portion, and the poppet may have an enlarged annular seat ring with a maximum outer diameter that is larger than the first and second constant valve diameters and smaller than the maximum relief diameter.

The first constant valve diameter may be the same as the second constant valve diameter. The enlarged annular seat ring may be distinct from and disposed about a shaft of the poppet. A length of the seat ring along the axis may be less than a length of the intermediate portion along the axis. The seat ring of the poppet may be movable between a first position in which it contacts the first seat and a second position in which it contacts the second seat. The intermediate portion of the valve lumen may be open radially toward an intermediate channel that extends to an exterior surface of the valve block.

A second aspect of the present invention is a solenoid operated valve including a valve block defining a valve lumen, a poppet slidably disposed within the valve lumen, a cylindrical armature including a base surface and an opposed pole surface, the armature defining an annular recess beneath the pole surface bounded by a base armature portion, a central armature portion, and an annular armature portion, wherein the armature is in communication with the poppet so that movement of one is translated into movement of the other, and a solenoid including a cylindrical core having a base surface and an opposed pole surface, the core defining an annular recess beneath the pole surface thereof bounded by a base core portion, a central core portion, and an annular core portion, and an annular winding disposed at least partially within both the annular recess of the core and the annular recess of the armature.

In accordance with other embodiments of the second aspect, the pole surface of the core may include distinct, coplanar surfaces on the central core portion and the annular core portion, and the pole surface of the armature may include distinct, coplanar surfaces on the central armature portion and the annular armature portion. The pole surface of the core may face the pole surface of the armature. The pole surface of the core may define a first plane and the pole surface of the armature may define a second plane, the first and second planes passing through the annular winding. The base core portion may form a monolithic structure with the annular core portion and the central core portion. The base armature portion may form a monolithic structure with the annular armature portion and the central armature portion. The solenoid operated valve may further include a coil cover enclosing the solenoid.

The armature may define an armature lumen through which a portion of the poppet is disposed. The winding may have an internal surface defining a winding lumen, and the armature lumen may be coaxially aligned with the winding lumen. The central core portion may be disposed within the winding lumen and the annular core portion may be disposed outside an external surface of the winding. The central armature portion may be disposed within the winding lumen and the annular armature portion may be disposed outside an external surface of the winding.

A third aspect of the present invention is a solenoid for operating a valve, including a cylindrical core including a base surface and an opposed pole surface, the core defining an annular recess beneath the pole surface bounded by a base core portion, a central core portion, and an annular core portion, an annular winding having a first portion disposed in the annular recess of the cylindrical core, and a second portion extending above the pole surface, and a cylindrical armature including a base surface and an opposed pole surface, the armature defining an annular recess beneath the pole surface thereof bounded by a base armature portion, a central armature portion, and an annular armature portion, wherein the second portion of the annular winding is positionable within the annular recess of the armature such that the armature can oscillate between a first position in which the pole surfaces of the armature and core are spaced a first distance from one another and a second position in which the pole surfaces are spaced a second distance from one another that is greater than the first distance.

A fourth aspect of the present invention is a solenoid for operating a valve, including a cylindrical core including a base surface and an opposed pole surface and an outer surface defining a core length therebetween, and having a core diameter, an annular winding having a winding diameter smaller than the core diameter and a winding length, the annular winding embedded in the core such that a portion of the winding length extends from the pole surface of the core, and a cylindrical armature including a base surface and an opposed pole surface and an outer surface defining an armature length therebetween, and having an armature diameter larger than the winding diameter, wherein the armature includes an opening extending from the pole surface and having an opening length substantially equal to the length of the portion of the winding length extending from the pole surface of the core for acceptance of the winding therein.

A fifth aspect of the present invention is a solenoid operated valve including a monolithic valve block defining a valve lumen, wherein the valve lumen defines a central axis and includes a first portion separated along the axis from a second portion by an intermediate portion, the first portion defines a first inner surface having a first constant valve diameter, the second portion defines a second inner surface having a second constant valve diameter, the intermediate portion has a maximum relief diameter that is larger than the first and second constant valve diameters, a first seat defined at the intersection of the first inner surface and the intermediate portion, and a second seat defined at the intersection of the second inner surface and the intermediate portion, a poppet slidably disposed within the valve lumen and having an enlarged annular seat ring with a maximum outer diameter that is larger than the first and second constant valve diameters and smaller than the maximum relief diameter, an armature in communication with the poppet so that movement of one is translated into movement of the other, and a solenoid including a winding and a core.

In accordance with other embodiments of the fifth aspect, the first constant valve diameter may be the same as the second constant valve diameter. The enlarged annular seat ring may be distinct from and disposed about a shaft of the poppet. A length of the seat ring along the axis may be less than a length of the intermediate portion along the axis. The seat ring of the poppet may be movable between a first position in which it contacts the first seat and a second position in which it contacts the second seat. The intermediate portion of the valve lumen may be open radially toward an intermediate channel that extends to an exterior surface of the valve block. The solenoid operated valve may further include a coil cover enclosing the solenoid.

A sixth aspect of the present invention is a solenoid operated valve, including a monolithic valve block defining a valve lumen extending from a first end to a second, opposite end, a first entrance opening to the valve lumen at the first end, a second entrance opening to the valve lumen at the second end, and an exit opening at an intermediate location between the first end and the second end, a first lumen pathway extending from the first end to the exit opening, establishing a first seat surface, and a second lumen pathway extending from the second end to the exit opening, establishing a second seat surface, the first lumen pathway having a first constant valve diameter and the second lumen pathway having a second constant valve diameter, the intermediate location having a maximum relief diameter larger than the first and second constant valve diameters, and a valve seat ring positioned at the intermediate location and having a diameter larger than the first and second constant valve diameters and less than the maximum relief diameter, the valve seat ring oscillatable between the first seat surface and the second seat surface to alternaternatingly block the first lumen pathway and the second lumen pathway.

A seventh aspect of the present invention is a valve block for use in a solenoid operated valve, including a monolithic structure defining a valve lumen, wherein the valve lumen defines a central axis and includes a first portion separated along the axis from a second portion by an intermediate portion, the first portion defines a first inner surface having a first constant valve diameter, the second portion defines a second inner surface having a second constant valve diameter, the intermediate portion has a maximum relief diameter that is larger than the first and second constant valve diameters, a first seat defined at the intersection of the first inner surface and the intermediate portion, and a second seat defined at the intersection of the second inner surface and the intermediate portion.

In accordance with other embodiments of the seventh aspect, a kit may including the valve block described above and a poppet slidably disposed within the valve lumen and having an enlarged annular seat ring with a maximum outer diameter that is larger than the first and second constant valve diameters and smaller than the maximum relief diameter.

A eighth aspect of the present invention is a method of assembling a solenoid operated valve including a monolithic valve block defining a valve lumen, wherein the valve lumen defines a central axis and includes a first portion separated along the axis from a second portion by an intermediate portion, the first portion defines a first inner surface having a first constant valve diameter, the second portion defines a second inner surface having a second constant valve diameter, and the intermediate portion has a maximum relief diameter that is larger than the first and second constant valve diameters, the method including steps of introducing an enlarged annular seat ring into the intermediate portion of the valve lumen, wherein the enlarged annular seat ring has a maximum outer diameter that is larger than the first and second constant valve diameters and smaller than the maximum relief diameter, and introducing a shaft of a poppet into the valve lumen and through the seat ring.

In accordance with other embodiments of the eighth aspect, the method may further include a step of securing the seat ring to a shaft of the poppet. The step of introducing the enlarged annular seat ring into the intermediate portion of the valve lumen may include passing the enlarged annular seat ring through an intermediate channel extending between an exterior surface of the valve block and the intermediate portion of the valve lumen.

DETAILED DESCRIPTION

A first embodiment of a solenoid operated valve 100 is shown in FIGS. 1-9 and includes a valve block 10, a poppet 40, a solenoid 50, and an armature 70. A coil cover 59 encloses solenoid 50 and armature 70 and is securely, fixedly connected with valve block 10.

Figure 5:
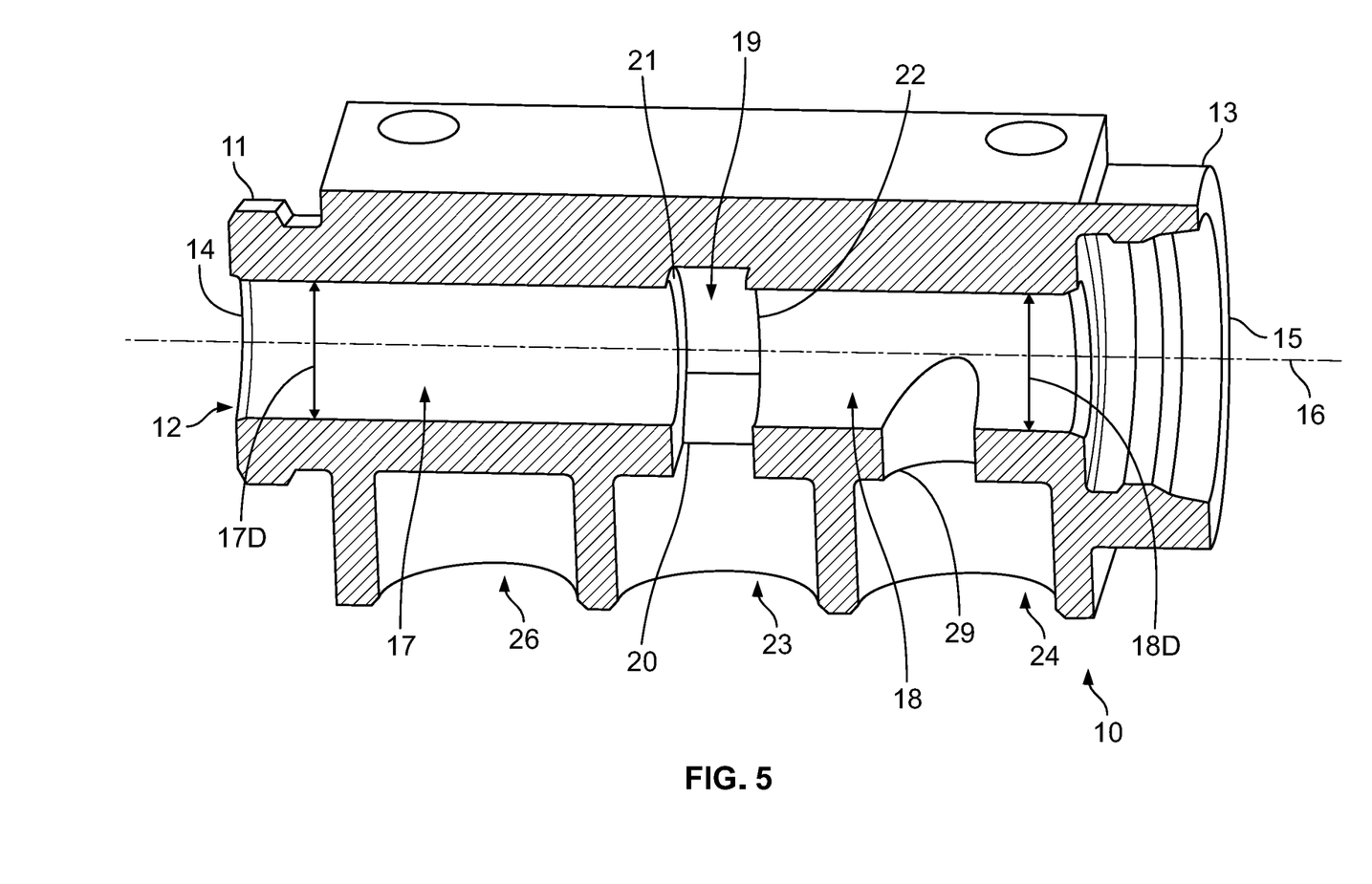
FIGS. 5 and 6 are sectional perspective and sectional plan views of a valve block of the valve shown in FIG. 1.
Figure 6:
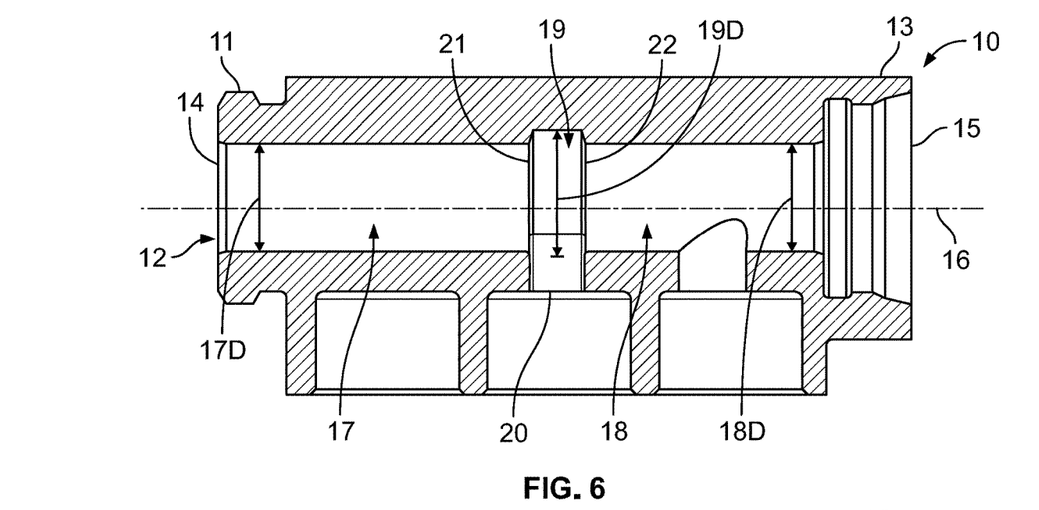

Valve block 10 is a monolithic structure that defines a lumen 12 extending along a central axis 16. Lumen 12 includes a first entrance opening 14 at a first end 11 of valve block 10, and a second entrance opening 15 at an opposite second end 13 of valve block 10. A first portion 17 of lumen 12 is separated along axis 16 from a second portion 18 of lumen 12, and an intermediate portion 19 is disposed between first and second portions 17, 18. Two perpendicular channels are connected to lumen 12 between first and second entrance openings 14, 15 along axis 16. As shown in FIGS. 5 and 6, a first of these channels is an outlet 23 located at intermediate portion 19 and connected to lumen 12 via an exit opening 20. A second of these channels is a second outlet 24 connected by an exit opening 29 to lumen 12 between intermediate portion 19 and second end 13.

Figure 7:
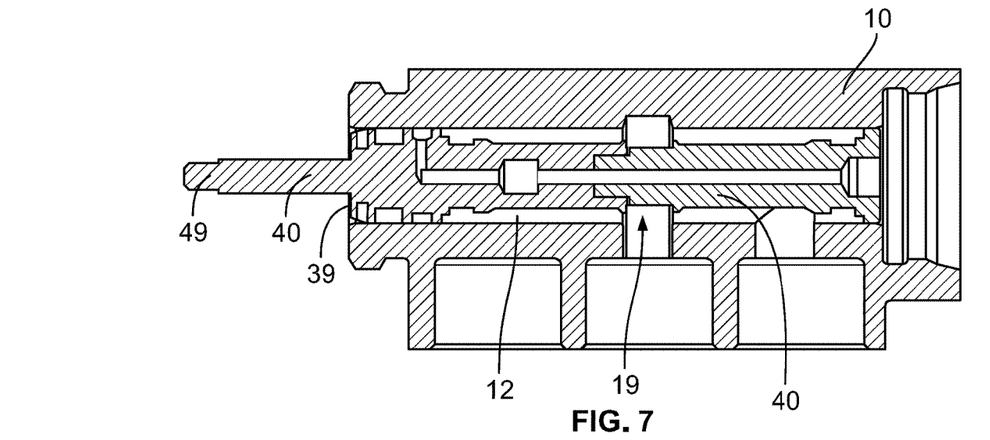
FIG. 7 is a sectional plan view of the valve block and a portion of a poppet of the valve shown in FIG. 1.

As shown in FIG. 7, first and second portions 17, 18 of lumen 12 each have respective inner diameters 17D, 18D that are constant as defined by respective inner surfaces. The values of the constant diameters 17D, 18D of the respective portions 17, 18 are preferably the same, but can be different from one another. In contrast, intermediate portion 19 has a maximum relief diameter 19D that is larger than both of inner diameters 17D, 18D. As intermediate portion 19 is provided with exit opening 20 as a channel extending radially therefrom to an exterior surface of valve block 10, the inner surface of intermediate portion 19, which is preferably mostly cylindrical, defines maximum relief diameter 19D.

This contouring of the inner surface of lumen 12 with the different portions and diameters defines first and second seats 21, 22 within the monolithic valve block 10. First seat 21 is defined at the intersection of first portion 17 and intermediate portion 19. Likewise, second seat 22 is defined at the intersection of second portion 18 and intermediate portion 19. As shown in FIGS. 6-9, the internal surface of intermediate portion 19 has transition surfaces at either end extending from the constant diameters 17D, 18D to maximum relief diameter 19D. These transition surfaces are annular and are slightly angled with respect to axis 16. First and second seats 21, 22 are formed at the intersection of these transition surfaces of intermediate portion 19 with first and second portions 17, 18, respectively. First and second seats 21, 22 are therefore annular surfaces that encircle lumen 12 with annular edges of the same diameter as inner diameters 17D, 18D, respectively.

Poppet 40 is slidably disposed to move back and forth in lumen 12 and has an enlarged annular seat ring 41 disposed within intermediate portion 19. Seat ring 41 is distinct from a main shaft 42 of poppet 40 and has a maximum outer diameter 41D smaller than maximum relief diameter 19D and larger than inner diameters 17D, 18D. Seat ring 41 is disposed about shaft 42 so that seat ring 41 is movable between a first position in which it contacts first seat 21 and a second position in which it contacts second seat 22. Seat ring 41 also has a length along the axis of poppet 40 that is less than a length of intermediate portion 19 along axis 16 of lumen 12 to facilitate this movement.

Figure 8:
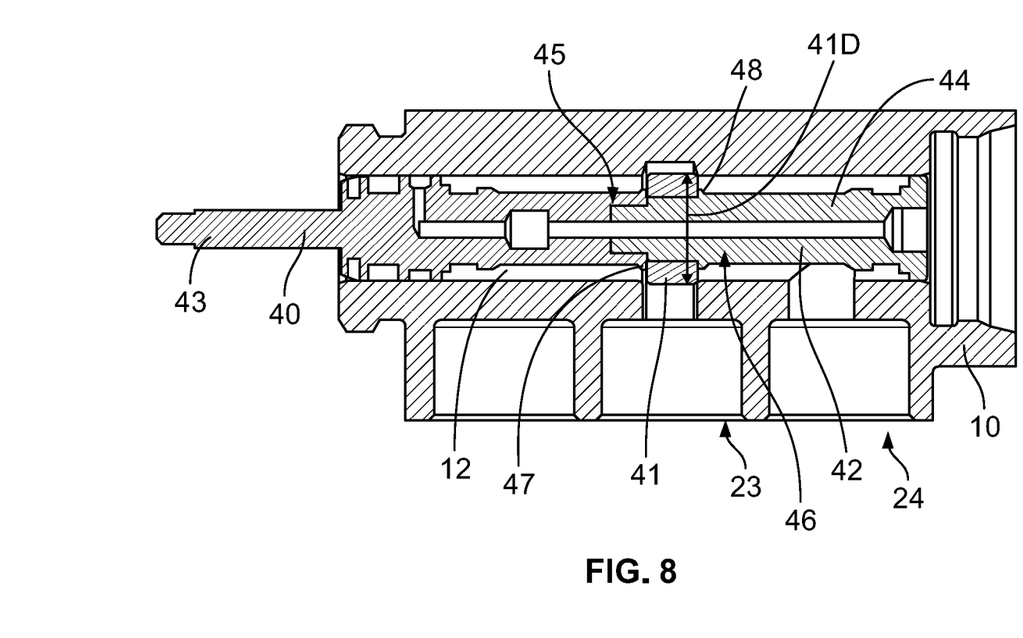
FIG. 8 is a sectional plan view of the valve block and the poppet of the valve shown in FIG. 1.
Figure 9:
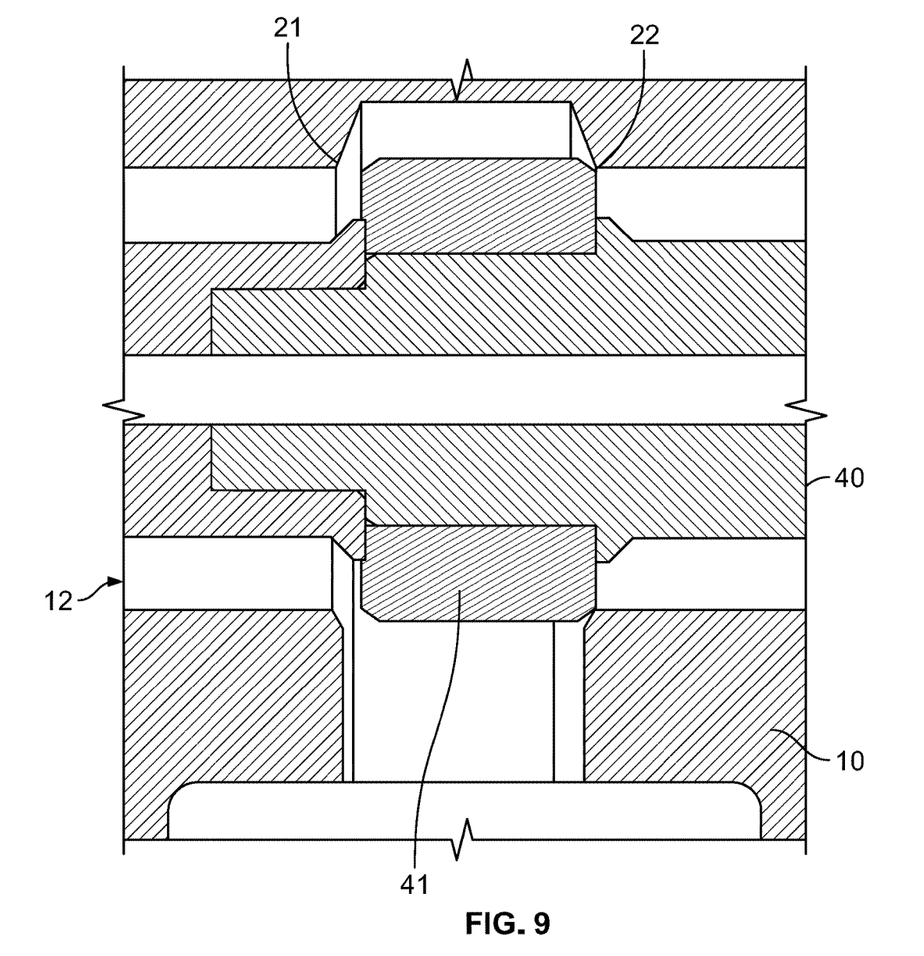
FIG. 9 is an enlarged view of a portion of the sectional plan view of FIG. 8.

Poppet 40 can be moved to different positions in which seat ring 41 is pressed against one of first and second seats 21, 22 to seal that seat and effectively open the other. With reference to FIGS. 8 and 9, when a force moves poppet 40 to the right, seat ring 41 engages second seat 22, thus opening an annular space and passage at first seat 21. This opens a passage or a pathway through first portion 17 from first end 11 or first entrance opening 14 to exit opening 20 at outlet 23 beneath intermediate portion 19. When a third outlet 26 is provided with an exit opening to communicate with lumen 12 between intermediate portion 19 and first end 11, this passage through first portion 17 can connect third outlet 26 to outlet 23 via first portion 17. Conversely, when a force moves poppet to the left, seat ring 41 engages first seat 21, thus opening an annular space and passage at second seat 22 so that a passage or a pathway extends through second portion 18 from second outlet 24 beneath second portion 18 to exit opening 20 at outlet 23 or to second end 13 or second opening 15. During use, this operation can be used to seal off the passage between outlets 23 and 24 when poppet 40 is disposed to the right and engages second seat 22, whereas the passage between outlets 23 and 24 is open when poppet 40 is disposed to the left and engages first seat 21. This is an on-off configuration, whereas in other embodiments, valve 100 can be used to switch flow toward outlet 23 from between second outlet 24 and third outlet 26.

Figure 10:
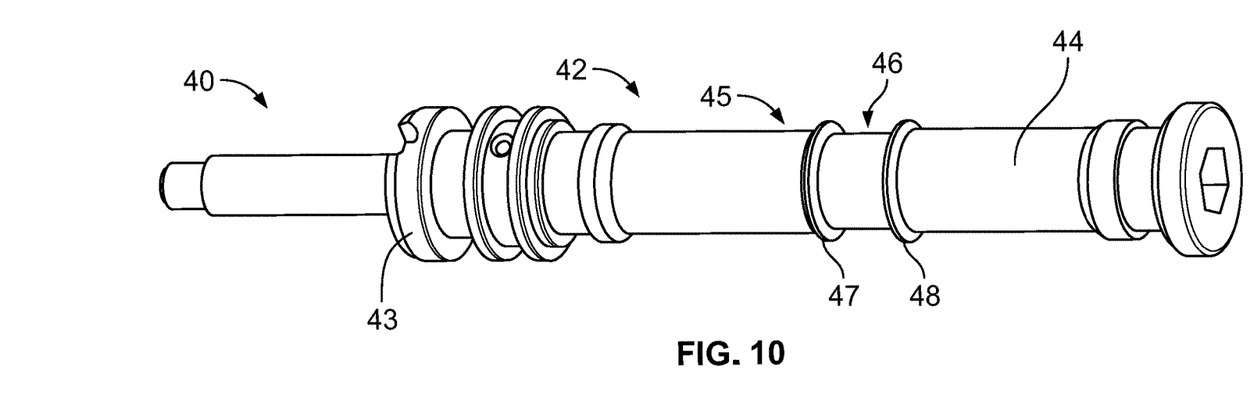
FIG. 10 is a perspective view of certain components of the poppet of the valve shown in FIG. 1.
Figure 11:
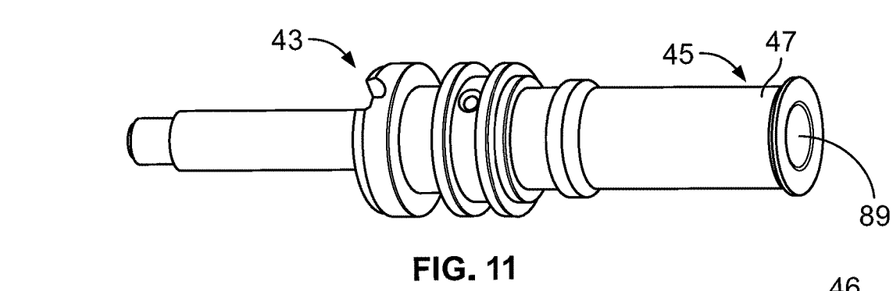
FIGS. 11 and 12 are perspective views of first and second shaft parts, respectively, of the poppet shown in FIG. 10.
Figure 12:
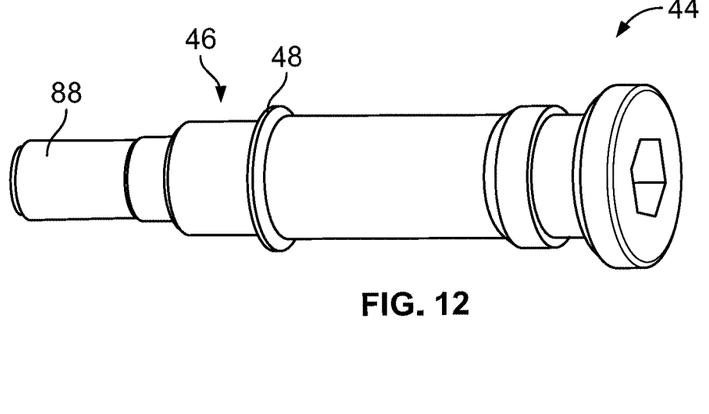

As shown in FIGS. 10-12, main shaft 42 of poppet is provided in a first shaft part 43 and a second shaft part 44 that can be securely connected together during use of valve 100. This facilitates assembly of poppet 40 given the contoured lumen 12 of valve block 10. That is, in order to overcome the drawbacks of prior art devices in which valve blocks are constructed of many pieces to accommodate the assembly of a solid, monolithic poppet, the present invention includes poppet 40 constructed of three components that are assembled into a monolithic valve block 100 having a single, integrally-formed surface of its lumen 12 to enhance lifetime, precision, and performance of valve 100 as a whole. This reduces the part or component count in the overall valve 100 by at least 25%, which significantly reduces the effect to which tolerances can negatively impact the final design of valve 100 and the reduces the chance of failure.

First shaft part 43 of poppet 40 can be first loaded into lumen 12 via first end 11 or second end 13 so that its rear central end 45 is located adjacent intermediate portion 19. Second shaft part 44 of poppet 40 can be loaded into lumen 12 via second end 13 so that its front central end 46 is located adjacent to rear central end 45 of first shaft part 43. Seat ring 41 is introduced into intermediate portion 19 of lumen 12 through outlet 23 and exit opening 20 until it is positioned centrally within lumen 12. First and second shaft parts 43, 44 are then advanced toward one another through the open space of seat ring 41 to connect shaft parts 43, 44 together. This can be done by threading a distal end 88 second shaft part 44 into a recess 89 of first shaft part 43, by press fitting, or any other means that secures shaft parts 43, 44 properly so that they will operate as one integral main shaft 42, as shown in FIG. 10. While this is done, seat ring 41 is secured about a central portion of main shaft 42 so that it also becomes an integral component of poppet 40, as shown in FIGS. 8 and 9.

First shaft part 43 has an annular lip 47 at its rear central end 45 that is of a diameter larger than the inner diameter of the aperture through seat ring 41. Likewise, second shaft part 43 has a similarly dimensioned annular lip 48 located inward of its front central end 46 so that when first and second shaft parts 43, 44 are secured together, the distance between lips 47 and 48 closely matches the width of seat ring 41. This allows seat ring 41 to be rigidly secured along the axis of main shaft 42 when poppet 40 is assembled into its final working configuration. Once the three components of poppet 40 are rigidly secured together within lumen 12 of valve block 10, the construct can be assembled to other components of valve 100.

Figure 1:
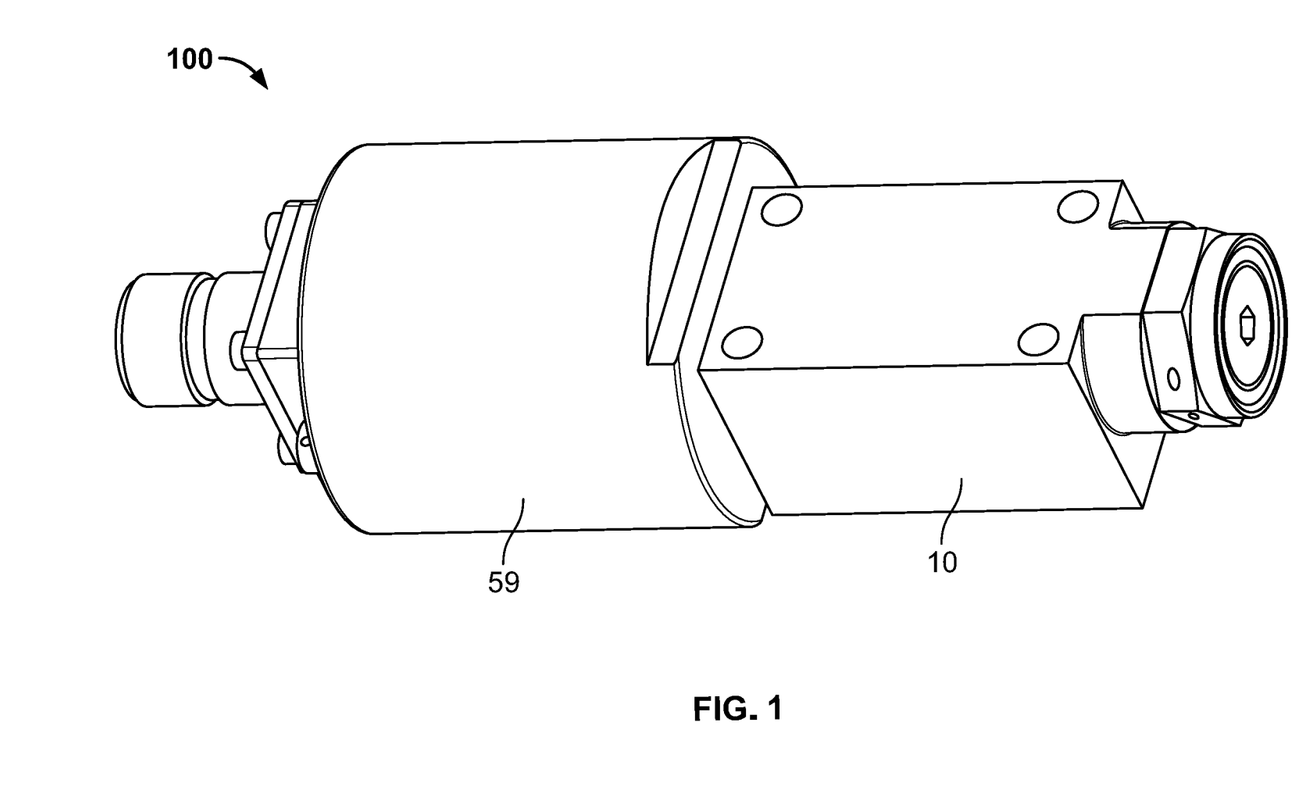
FIG. 1 is a perspective view of a solenoid operated valve in accordance with a first embodiment of the present invention.
Figure 2:
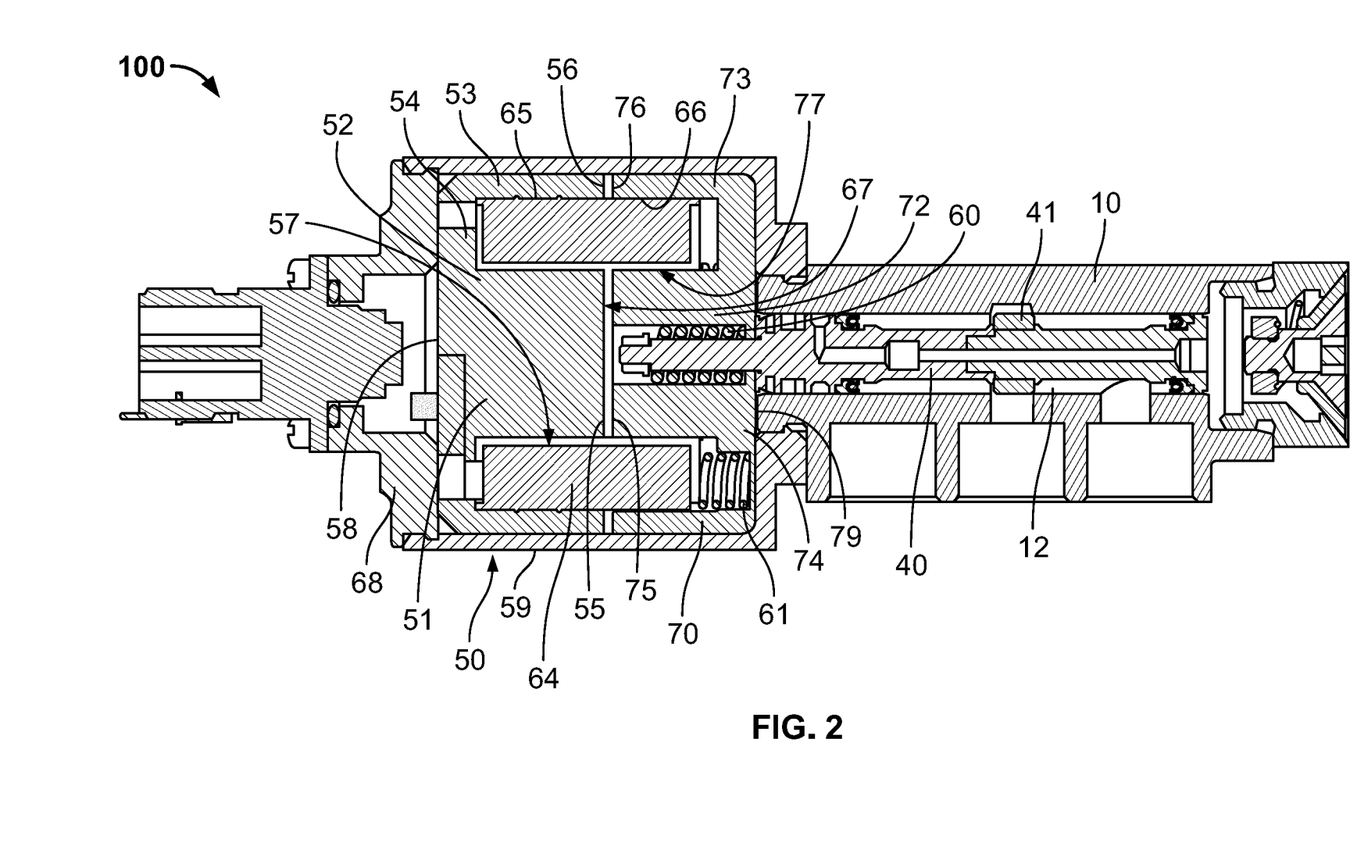
FIG. 2 is a sectional plan view of the valve shown in FIG. 1.
Figure 3:
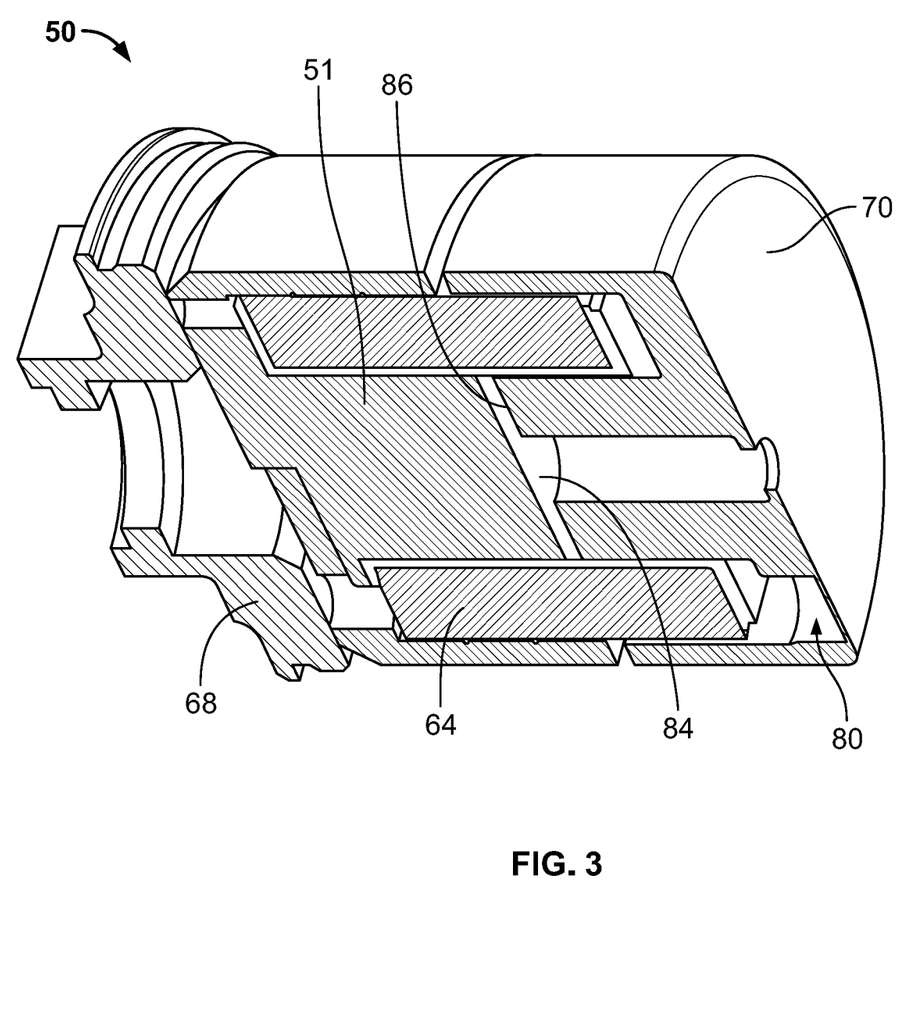
FIGS. 3 and 4 are sectional perspective and sectional plan views, respectively, of components of the solenoid and the armature of the valve shown in FIG. 1.
Figure 4:
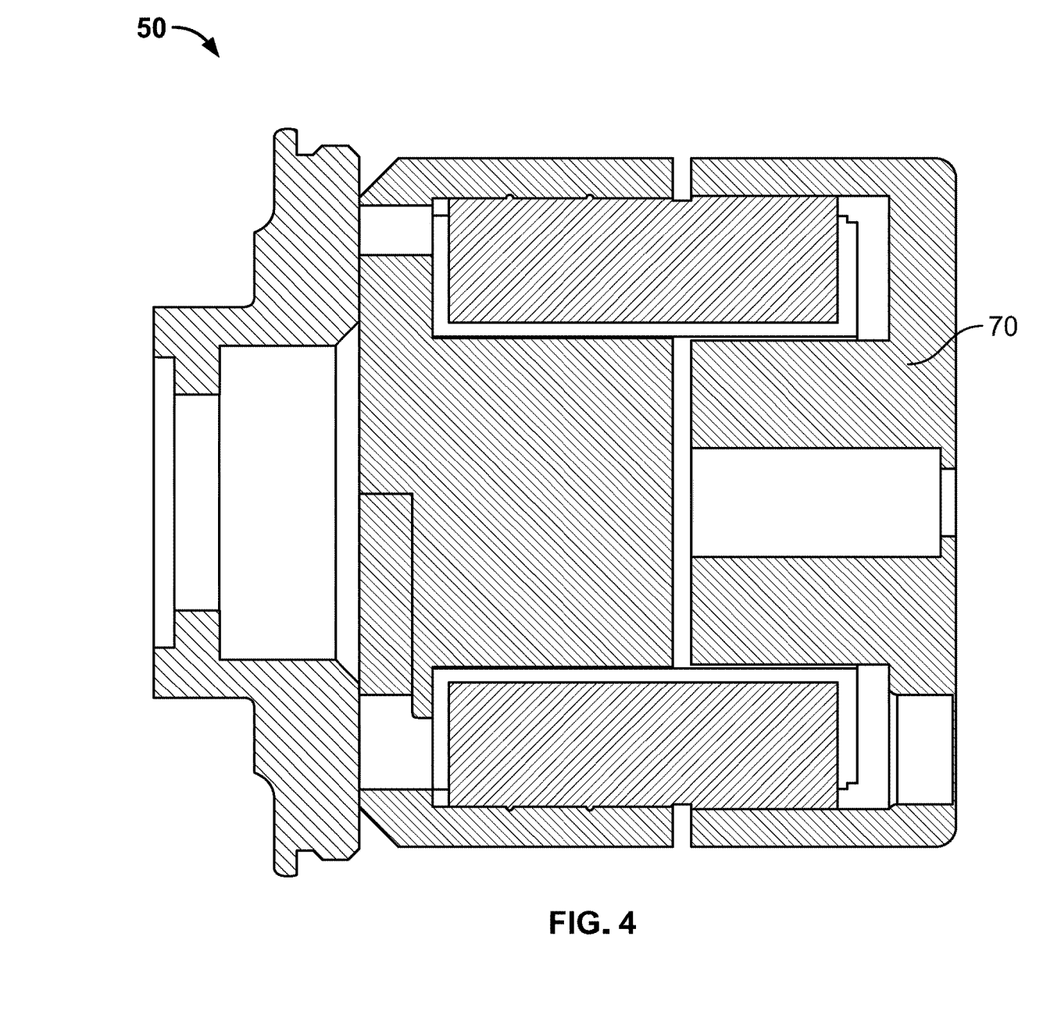

As shown in FIGS. 2-4, solenoid 50 is located adjacent valve block 10 and includes a core or coil assembly 51 and an annular winding 64 that form a novel geometry, along with armature 70. Winding is comprised of a wound coil on a bracket. The coil is encapsulated in an epoxy or potting compound to secure the windings and the bobbin to core 51. Winding 64 has an external surface 65 and an internal surface 66 defining a lumen 67. Internal surface 66 faces a central axis of lumen 67, while external surface 65 faces away from the central axis of lumen 67. Internal and external surfaces 66, 67 are connected by annular end surfaces that are generally perpendicular to the central axis of lumen 67. External surface 65 defines a winding diameter, and a winding length is measured between its annular end surfaces.

Core 51 is shaped like a cup with a central portion that extends from the floor of the recess of the cup up to the lid of the cup to create an annular recess. That is, core 51 is a cylindrical monolithic structure having a central core portion 52, an annular core portion 53, and a base core portion 54 with a base surface 58. Central core portion 52 and annular core portion 53 have coplanar pole surfaces 55, 56, respectively, that together comprise one pole surface 84 that are opposite base core portion 54 and that, if extended into a plane, pass through winding 64. The external surface of annular core portion 53 defines a core diameter, and a length of core 51 is defined between base surface 58 and pole surface 84 along a central axis of core 51. The core diameter is larger than the winding diameter. The space radially between central core portion 52 and annular core portion 53 with respect to a central axis of central core portion 52 defines an annular recess 57 of core 51. That is, annular recess 57 is bounded by base core portion 54, central core portion 52, annular core portion 53, and a plane defined by pole surface 84.

Armature 70 is similar in shape to core 51 except for also including a central lumen 78 that extends through base armature portion 74 and central armature portion 72. In valve 100, lumens 12, 67, and 78 are coaxially and concentrically aligned. That is, armature 70 is a cylindrical monolithic structure having a central armature portion 72, an annular armature portion 73, and a base armature portion 74 with a base surface 79. Central armature portion 72 and annular armature portion 73 have coplanar pole surfaces 75, 76, respectively, that together comprise pole surface 86 and are opposite base armature portion 74 and that, if extended into a plane, pass through winding 64. The external surface of annular core portion 73 defines an armature diameter larger than the winding diameter, and a length of armature 70 is defined between base surface 79 and pole surface 86 along a central axis of armature 70. The space radially between central armature portion 72 and annular armature portion 73 with respect to a central axis of central armature portion 72 defines an annular recess 77 of armature 70. That is, annular recess 77 is bounded by base armature portion 74, central armature portion 72, annular armature portion 73, and a plane defined by pole surface 86.

Central core portion 52 of core 51 and central armature portion 72 of armature 70 are disposed radially within lumen 67 of winding 64. Annular core portion 53 of core 51 and annular armature portion 73 of armature 70 are disposed radially outside external surface 65 of winding 64. That is, winding 64 is disposed at least partially radially within annular recess 57 of core 51 and at least partially within annular recess 77 of armature 70, such that coplanar pole surfaces 55, 56 of core 51 face coplanar pole surfaces 75, 76 of armature 70. Stated another way, winding 64 is embedded within annular recess 57 of core 51 such that a portion of the length of winding 64 extends beyond pole surface 84 of core 51. A depth of annular recess 77 of armature 70 is at least equal to this extended portion of the length of winding 64 so that this extended length of winding 64 can be accepted within annular recess 77.

In one embodiment, a depth of annular recess 57 of core 51 is substantially equal to 50% of the winding length, and a depth of annular recess 77 is substantially equal to 50% of the winding length. In this way, when valve 100 is energized, coplanar pole surfaces 55, 56 of core 51 and coplanar pole surfaces 75, 76 of armature 70 are each situated substantially half way between the ends of winding 64. In other embodiments, the combined depths of annular recess 57 and annular recess 77 are substantially equal to the winding length, with annular recess 57 and annular recess 77 each individually constituting at least 45% of the winding length. In other words, when valve 100 is energized, coplanar pole surfaces 55, 56 of core 51 and coplanar pole surfaces 75, 76 of armature 70 are located within the middle 10% of the winding length, or at least 45% of the winding length from each end of the winding.

The novel geometry of solenoid 50 provides a break in the magnetic path during operation of solenoid 50 by extending pole surfaces 84 and 86 through winding 64. Prior art devices have not included a pole surface defined a plane that extends through the winding. Rather, in prior art devices, if one of the core and armature was designed to appear like either core 51 or armature 70 of valve 100 described herein, the annular recess defined by the structure was of a depth such that it housed the entire winding, such that the other of the core and winding had a complete, unbroken, circular pole surface. In this way, if a core or armature of a prior art device had two pole faces, they were located at an end of the winding and not in a middle portion of its length. Another common feature of prior art designs is to have the air gap, or distance between opposing pole faces of the core and armature, only within the winding lumen.

With the design of valve 100, maximum force between core 51 and armature 70 is achieved when valve 100 is energized, with the air gap centered between each end of winding 64. This central location coincides with the location of maximum magnetic flux since it is the location along winding 64 where the magnetic force is parallel or substantially parallel to the axis of the lumen of winding 64. The magnetic flux is less at an end of the winding since the magnetic force is angled to a larger extent with respect to the axis of the lumen of a winding, and therefore prior art devices with an air gap at an end of the winding provide and utilize less force. Placing the air gap at the center of winding 64 of valve 100 creates a force that is 20% to 50% greater, depending on the actual width of the air gap.

Valve 100 according to the present invention has a core 51 with two coplanar pole surfaces 55, 56 and an armature with two coplanar pole surfaces 75, 76, with all of these surfaces having central axes that are aligned and collinear with a central axis of winding 64.

Armature 70 is in communication with poppet 40, which has an end that extends through central lumen 78, so that movement of one is translated into movement of the other. An external end 49 of first shaft part 43 of poppet is dimensioned to be disposed within lumen 78 of armature. A spring 60 is disposed about external end 49 and can be secured between a nut screwed onto external end and a flange at the end of lumen 78 at base surface 79 of armature 70. In this way, spring 60 tends to keep armature 70 and poppet 40 biased toward one another and tightly connected when the elements are at rest. Movement of armature 70 toward poppet 40 generates corresponding movement of poppet 40, which is based both on the tension in spring 60 and also on the force base surface 79 of armature 70 exhibits directly on an annular surface 39 of poppet 40, as shown in FIG. 7. Movement of armature 70 away from poppet 40 actively pulls poppet 40 along in the same direction via the force of spring 60. Armature 70 and poppet 40 are disconnected (i.e. separate elements as opposed to one monolithic piece) to prevent misalignment of poppet 40 on first and second seats 21, 22.

When valve 100 is at rest, core 51, winding 64, and a solenoid cap 68 connected to coil cover 59 remain stationary. Armature 70 includes three spring recesses 80 beneath and open toward its annular recess 77, as shown in FIG. 3. Within each spring recess 80 is disposed a spring 61, as shown in FIG. 2. Springs 61 exert pressure against the adjacent end surface of winding 64 and the bottom of spring recesses 80 of armature 70 to naturally push armature 70 away from winding 64 and core 51. The static construct of solenoid cap 68 and coil cover 59 define a farthest distance core 51 can be separated from armature 70 before each bottoms out within the construct. In this way, springs 61 maintain valve 100 in a position at rest in which armature 70 is moved toward valve block 10, and correspondingly, poppet 40 is in the de-energized position such that seat ring 41 contacts second seat 22.

During operation of valve, when an electrical current is passed through winding 64, an electromagnetic field is generated around solenoid 50 which attracts armature 70 to core 51. Because of the connection between armature 70 and poppet 40 via spring 60, this in turn moves poppet 40 when valve 100 is energized. Armature 70 can oscillate between a first position in which pole surfaces 86, 84 of armature 70 and core 51, respectively, are spaced a first distance from one another or are even touching when valve 100 is energized, and a second position in which valve 100 is de-energized and pole surface 86, 84 are spaced a second greater distance from one another, as shown in FIG. 2 for example.

This movement is finely tuned to coincide with poppet 40 contacting seats 21, 22 in these energized and de-energized states, respectively, of valve 100. The distance poppet 40 moves between engagement of first and second seats 21, 22 is about ten thousandths of an inch, though different configurations and sizes of similar solenoid operated valves can have different lengths of poppet movement. In this way, seat ring 41 is oscillatable between first and second seats 21, 22 to alternaternatingly block first and second portions 17, 18, respectively, as described above.

When assembling a solenoid operated valve such as valve 100, the respective loads placed on first seat 21 and on second seat 22 should be set properly and should be balanced. In valve 100, first seat 21 is the energized seat, due to poppet 40 being forced into contact with first seat 21 based on an energized armature 70 moved toward core 51 and moving poppet 40 into contact with first seat 21. Second seat 22 is the de-energized seat, due to poppet 40 being biased against second seat 22 under the influence of springs 61 and absent a counter force that would otherwise be provided by armature 70 when it is energized.

While poppet 40 is described above as being constructed of three parts in order to facilitate its assembly within lumen 12 of valve block 10, poppet can be constructed as a singled monolithic device. This can be done by additive manufacturing or 3D printing in which poppet 40 and valve block 10 are manufactured simultaneously through an additive manufacturing procedure. In that way, seat ring 41 can be located in intermediate portion 19 of lumen 12 while poppet 40 and valve block 10 are distinct and relatively movable components. This even further reduces the total part count in an effort to prolong use of valve 100 and to prevent failure during use.

Solenoid 50 can be provided apart from the other components of valve 100 so that it is supplied for use in other capacities, particularly with armature 70 or with a differently configured armature. That is, solenoid 50 can be supplied and packaged on its own, can be supplied and packaged in a kit with armature 70 or with a different armature, can be supplied and packaged in a kit with armature 70 (or with a different armature) and poppet 40, and can be supplied and packaged as a part of valve 100.

Materials utilized in the construction of valve 100 can include the following. First and second shaft parts 43, 44 of poppet 40 are made of stainless steels, bronze, nickel alloys, etc. Seat ring 41 is made of plastic, such as polyimide, PEEK, PTFE, nylon, PCTFE, etc. Core 51 and armature 70 are made of low carbon steel or electrical iron. Coil cover 59 and the coil mount are made of aluminum. Other aspects of valve 100, such as valve block 10, are made of metal, such as aluminum, stainless steel, bronze, nickel alloys, etc. Of course other materials similar in nature and performance to these can be used.

Figure 13:
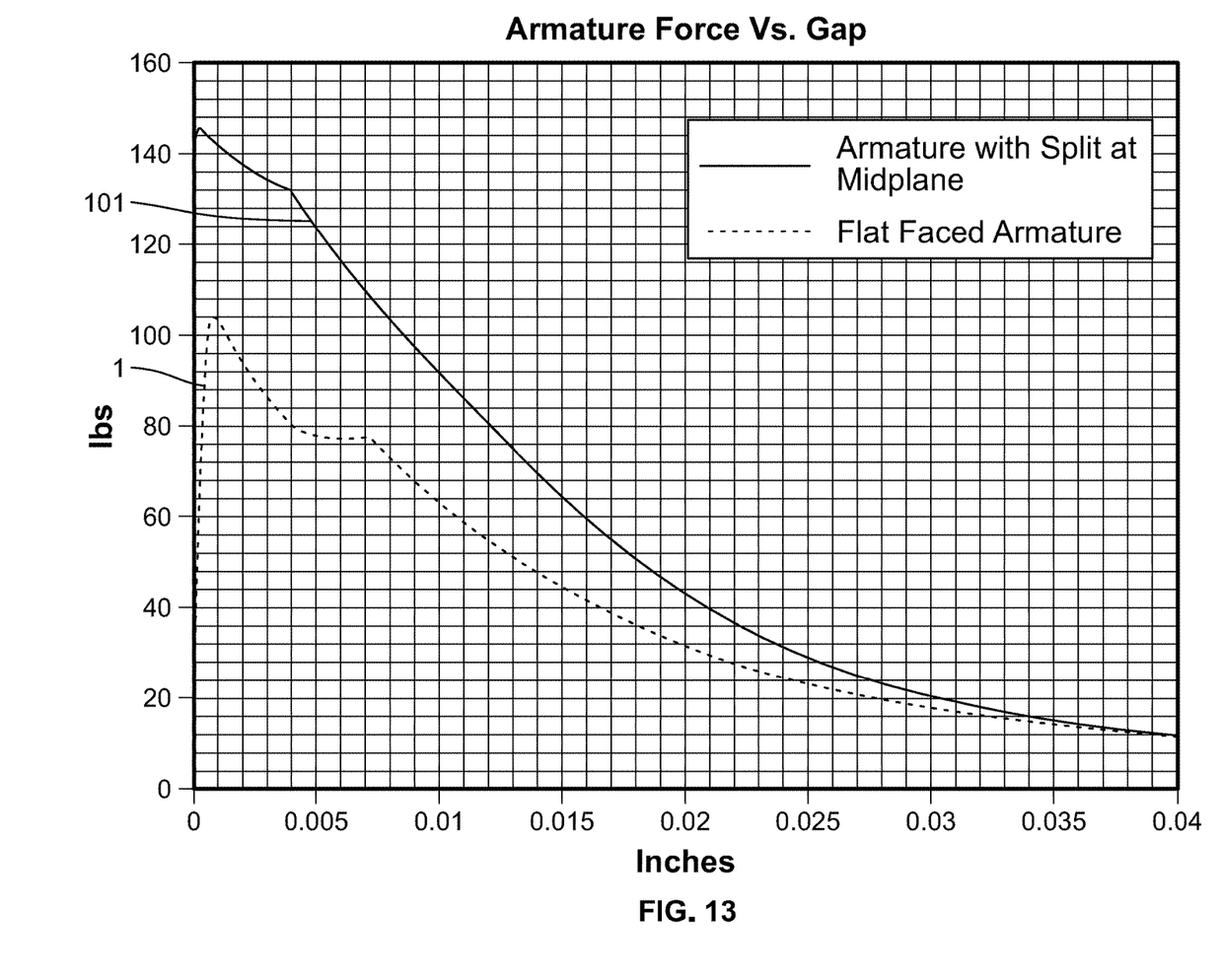
FIG. 13 is a plot of test results showing the pull curves of the valve shown in FIG. 1 and of a prior art solenoid valve.

Testing of valve 100 reveals its superior performance to prior art solenoid valves. In particular, FIG. 13 is a plot of the pull curves of valve 100 and of a prior art solenoid valve. The prior art solenoid has a flat faced armature disposed at an end of its annular winding, i.e. at the right side of the winding assembly shown in FIG. 2. The core of the prior art valve has an annular recess that is deeper than that of core 51 of valve 100, such that the entire winding assembly of the prior art solenoid valve is disposed within the annular recess defined by the core. Each pull curve shows a comparison of the magnetic coil force (lbs.) provided to the armature versus the air gap (stroke) (inches) between the pole faces of the core and armature. As shown in FIG. 13, line 101 depicts the pull curve for valve 100, whereas line 1 depicts the pull curve for the prior art valve. The value of the magnetic coil force provided to armature 70 of valve 100 is greater than that provided to the armature of the prior art solenoid valve at every value of the air gap, owing to the location of pole surfaces 55, 56 of core 51 and pole surfaces 75, 76 of armature 70 being substantially half way between the ends of winding 64. This data evidences a stronger force for moving poppet 40 more quickly to enhance the precision with which valve 100 operates to open and close its flowpath(s). This also evidences a stronger holding force for maintaining the seal of poppet 40 at seats 21, 22 within valve block 10. All of this results in superior performance of valve 100 when compared with prior art valves having a flat face armature with air gaps inside the winding lumen and outside the exterior of the winding at only one end of the coil.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A solenoid operated valve comprising:
 a monolithic valve block defining a valve lumen, wherein:
  the valve lumen defines a central axis and includes a first portion separated along the axis from a second portion by an intermediate portion,
  the first portion defines a first inner surface having a first constant valve diameter,
  the second portion defines a second inner surface having a second constant valve diameter,
  the intermediate portion has a maximum relief diameter that is larger than the first and second constant valve diameters,
  a first seat defined at an intersection of the first inner surface and the intermediate portion, and
  a second seat defined at an intersection of the second inner surface and the intermediate portion;
 a poppet including a first shaft part, a second shaft part, and an enlarged annular seat ring assembled such that the first shaft part and the second shaft part both contact the annular seat ring, the poppet being slidably disposed within the valve lumen, wherein the enlarged annular seat ring has a maximum outer diameter that is larger than the first and second constant valve diameters and smaller than the maximum relief diameter;
 an armature in communication with the poppet so that movement of one is translated into movement of the other; and
 a solenoid including a winding and a core.

2. The solenoid operated valve of claim 1, wherein the first constant valve diameter is the same as the second constant valve diameter.

3. The solenoid operated valve of claim 1, wherein the enlarged annular seat ring is distinct from and disposed about a shaft of the poppet.

4. The solenoid operated valve of claim 1, wherein a length of the seat ring along the axis is less than a length of the intermediate portion along the axis.

5. The solenoid operated valve of claim 4, wherein the seat ring of the poppet is movable between a first position in which it contacts the first seat and a second position in which it contacts the second seat.

6. The solenoid operated valve of claim 1, wherein the intermediate portion of the valve lumen is open radially toward an intermediate channel that extends to an exterior surface of the valve block.

7. The solenoid operated valve of claim 1, further comprising a coil cover enclosing the solenoid.

8. The solenoid operated valve of claim 1,
 wherein the winding of the solenoid is an annular winding with an internal surface defining a winding lumen and an external surface, and the core of the solenoid includes a central core portion disposed within the winding lumen and an annular core portion disposed outside the external surface of the winding; and
 wherein the armature includes a central armature portion disposed within the winding lumen and an annular armature portion disposed outside the external surface of the winding.

9. The solenoid operated valve of claim 1, wherein the central core portion has a pole surface and the annular core portion has a pole surface coplanar with the pole surface of the central core portion, and the central armature portion has a pole surface and the annular armature portion has a pole surface coplanar with the pole surface of the central armature portion.

10. The solenoid operated valve of claim 9, wherein the coplanar pole surfaces of the core face the coplanar pole surfaces of the armature.

11. The solenoid operated valve of claim 9, wherein the coplanar pole surfaces of the core define a first plane and the coplanar pole surfaces of the armature define a second plane, the first and second planes passing through the annular winding.

12. The solenoid operated valve of claim 11, wherein, when the valve is energized, the coplanar pole surfaces of the core and the coplanar pole surfaces of the armature are each situated substantially half way between ends of the winding.

13. The solenoid operated valve of claim 9, wherein the core includes a base core portion opposite the pole surfaces of the annular core portion and the central core portion, the base core portion forming a monolithic structure with the annular core portion and the central core portion.

14. The solenoid operated valve of claim 13, wherein the core defines an annular recess bounded by the base core portion, the annular core portion, and the central core portion, wherein the winding is disposed at least partially within the annular recess of the core.

15. The solenoid operated valve of claim 9, wherein the armature includes a base armature portion opposite the pole surfaces of the annular armature portion and the central armature portion, the base armature portion forming a monolithic structure with the annular armature portion and the central armature portion.

16. The solenoid operated valve of claim 15, wherein the armature defines an annular recess bounded by the base armature portion, the annular armature portion, and the central armature portion, wherein the winding is disposed at least partially within the annular recess of the armature.

17. The solenoid operated valve of claim 15, wherein the base armature portion and central armature portion define an armature lumen through which a portion of the poppet is disposed.

18. The solenoid operated valve of claim 1, wherein an end of the second shaft part is threaded into a recess of the first shaft part.

19. The solenoid operated valve of claim 1, wherein an end of the second shaft part is press fit into a recess of the first shaft part.

20. The solenoid operated valve of claim 1, wherein the seat ring is comprised of plastic, including at least one of polyimide, PEEK, PTFE, nylon, or PCTFE.

21. A valve, comprising:
a monolithic valve block defining a valve lumen extending from a first end to a second, opposite end;
a first entrance opening to the valve lumen at the first end, a second entrance opening to the valve lumen at the second end, and an exit opening at an intermediate location between the first end and the second end;
a first lumen pathway extending from the first end to the exit opening, establishing a first seat surface, and a second lumen pathway extending from the second end to the exit opening, establishing a second seat surface, the first lumen pathway having a first constant valve diameter and the second lumen pathway having a second constant valve diameter;
the intermediate location having a maximum relief diameter larger than the first and second constant valve diameters; and
a poppet including a first shaft part, a second shaft part, and a valve seat ring assembled such that the first shaft part and the second shaft part both contact the valve seat ring, the valve seat ring being positioned at the intermediate location and having a diameter larger than the first and second constant valve diameters and less than the maximum relief diameter, the valve seat ring oscillatable between the first seat surface and the second seat surface to alternatingly block the first lumen pathway and the second lumen pathway.

22. A kit comprising:
a valve block for use in a solenoid operated valve, including:
a monolithic structure defining a valve lumen, wherein:
the valve lumen defines a central axis and includes a first portion separated along the axis from a second portion by an intermediate portion,
the first portion defines a first inner surface having a first constant valve diameter,
the second portion defines a second inner surface having a second constant valve diameter,
the intermediate portion has a maximum relief diameter that is larger than the first and second constant valve diameters,
a first seat defined at an intersection of the first inner surface and the intermediate portion, and
a second seat defined at an intersection of the second inner surface and the intermediate portion; and
a poppet including a first shaft part, a second shaft part, and an enlarged annular seat ring assembled such that the first shaft part and the second shaft part both contact the annular seat ring, the poppet being slidably disposed within the valve lumen, wherein the enlarged annular seat ring has a maximum outer diameter that is larger than the first and second constant valve diameters and smaller than the maximum relief diameter.

* * * * *